W. B. HINKLEY.
Combined Coffee Roaster and Oven.

No. 217,376. Patented July 8, 1879.

WITNESSES:
G. A. Bennett.
D. F. Spees.

INVENTOR.
William B Hinkley
per E. O. Frink
his Attorney

UNITED STATES PATENT OFFICE.

WILLIAM B. HINKLEY, OF INDIANAPOLIS, INDIANA, ASSIGNOR TO HIMSELF AND SAMUEL L. WININGS, OF SAME PLACE.

IMPROVEMENT IN COMBINED COFFEE ROASTER AND OVEN.

Specification forming part of Letters Patent No. 217,376, dated July 8, 1879; application filed March 28, 1879.

*To all whom it may concern:*

Be it known that I, WILLIAM B. HINKLEY, of Indianapolis, in the county of Marion and State of Indiana, have invented a new and useful Improvement in Combined Coffee Roaster and Oven, of which the following is a description, reference being had to the accompanying drawings.

My invention relates to a coffee-roaster.

The object of my invention is to provide a coffee-roaster and means of operating it in an oven, whereby the coffee while roasting can be stirred and evenly roasted.

My invention consists in the new construction and arrangement of parts of the roaster, and in the new combination of elements, as will be hereinafter fully described and set forth.

Figure 3:
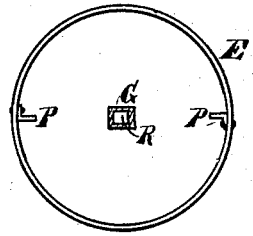
Figure 1:
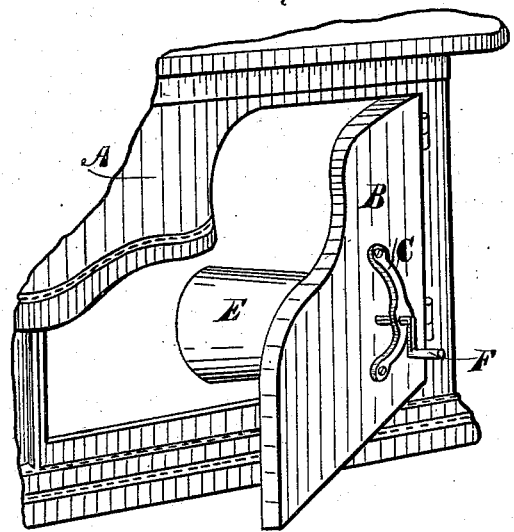
Figure 4:
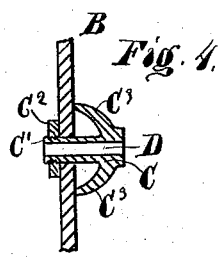
Figure 2:
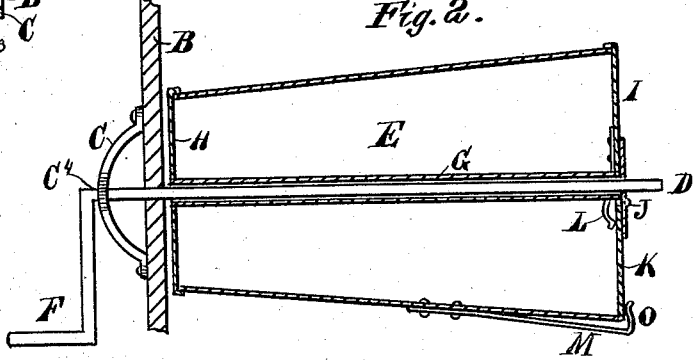

Referring to the drawings, in which like letters of reference in the different figures indicate like parts, Figure 1 represents a perspective view of a portion of a stove, showing my improved coffee-roaster attached to an oven-door. Fig. 2 is a sectional view of the roasting-chamber, showing the manner in which it is attached to an oven-door. Fig. 3 is a cross-section of the roasting-chamber, and Fig. 4 represents one form of bracket for supporting the roasting-chamber in the oven.

A represents any ordinary stove, and B the oven-door. The roasting-chamber E is constructed of sheet metal, and is larger at one end than at the other.

On the inside of the chamber E are attached two or more longitudinal ribs, P P, for stirring and mixing the coffee as the chamber is revolved. In the center of the chamber E is a hollow square tube, G, extending from end to end, to receive the crank-shaft D F. The small head, H, of the chamber is made solid, with no opening except at the center to receive the crank-shaft. The other or large end, formed in part of the stationary head I, which covers a little more than one-half of the end, is also provided with a hole to allow the crank-rod D to pass through.

The lower part, K, of the head I is a door, hinged to the part I at J, and is held shut by means of the spring-catch M. The spring L is secured to the head I, and operates against the inside of the door K, to force it open when the spring-catch M is released, as shown in Fig. 2.

The bracket C is secured to the oven-door on the outside, and the crank-shaft D passes through the hole $C^4$ in the bracket C, and through a corresponding hole in the door B. Thus a support is formed for the shaft.

The chamber E is placed on the shaft D, so as to allow the chamber to extend inside of the oven when the door is closed, and the chamber is made short enough to permit the door to be opened and allow the chamber to clear the door-frame, as shown in Fig. 1.

The bracket C may be made in the form shown in Fig. 4. Thus the lugs $C^3 C^3$ come in contact with the outer surface of the door, and the hollow part $C^1$ extends through a hole formed in the door, and is provided with a nut, $C^2$, to clamp the bracket to the door, as shown in Fig. 4.

The shaft D passes through the hole D', and supports the chamber in the same manner as shown in Fig. 2.

The operation of my improved device is as follows, to-wit: The door K of the chamber is opened, and the desired quantity of coffee is placed in the chamber E. The shaft D is then inserted in the bracket C through the door B. The chamber E is then placed on the shaft, and the oven-door closed. As the coffee begins to roast, the crank F is revolved occasionally, and the ribs P P stir the contents of the chamber. This operation is continued until the coffee is roasted.

The condition of the coffee may be frequently examined by swinging open the oven-door and opening the door K.

The central hollow tube, G, and door K prevent the aroma from escaping from the chamber or coffee-receptacle.

What I claim as new, and desire to secure by Letters Patent, is—

1. The cylinder E, constructed tapering and provided with a hollow square tube extending through the cylinder longitudinally from end to end, and with a door, K, a catch-spring, M O, spring L, and ribs P P, as and for the purpose specified.

2. In combination with oven-door B, the roasting-chamber E, having a hollow square tube, G, extending through the center of the chamber longitudinally, and further provided with a door, K, spring-catch M O, spring L, and ribs P P, the crank-shaft F D, bracket C, and oven-door B, as and for the purpose specified.

In testimony whereof I have signed my name to this specification in the presence of two subscribing witnesses.

WILLIAM B. HINKLEY.

Witnesses:
E. O. FRINK,
GEORGE RENNETT.